United States Patent
Bjurström

(10) Patent No.: US 11,200,428 B2
(45) Date of Patent: Dec. 14, 2021

(54) SYSTEMS AND METHODS FOR DOOR ERROR DETECTION

(71) Applicant: ICOMERA AB, Gothenburg (SE)

(72) Inventor: Joel Bjurström, Gothenburg (SE)

(73) Assignee: Icomera AB, Gothenburg (SE)

(*) Notice: Subject to any disclaimer, the term of this patent is extended or adjusted under 35 U.S.C. 154(b) by 80 days.

(21) Appl. No.: 16/834,297

(22) Filed: Mar. 30, 2020

(65) Prior Publication Data

US 2020/0320311 A1 Oct. 8, 2020

(30) Foreign Application Priority Data

Apr. 4, 2019 (SE) .................................. 1950417-4

(51) Int. Cl.
*G06K 9/00* (2006.01)
*B61D 3/00* (2006.01)
(Continued)

(52) U.S. Cl.
CPC .......... *G06K 9/00771* (2013.01); *E05F 15/40* (2015.01); *G06K 9/00711* (2013.01);
(Continued)

(58) Field of Classification Search
USPC ........ 382/100, 103, 106–107, 120–122, 155, 382/168, 173, 181, 199, 219, 224, 254,
(Continued)

(56) References Cited

U.S. PATENT DOCUMENTS

2013/0125468 A1 5/2013 El Fassi et al.
2017/0013237 A1* 1/2017 Ito ..................... H04N 5/232933
(Continued)

FOREIGN PATENT DOCUMENTS

EP 0852313 B1 6/1997
EP 1345444 A1 11/2002
(Continued)

OTHER PUBLICATIONS

Swedish Application No. 1950417-4, Search Report dated Oct. 29, 2019, 8 pages.
(Continued)

*Primary Examiner* — Seyed H Azarian
(74) *Attorney, Agent, or Firm* — Avant Law Group, LLC

(57) ABSTRACT

Systems and methods for monitoring an operation of a door of a public transportation vehicle are disclosed. In an embodiment, the system includes an optical sensor unit and a control unit. The optical sensor is arranged at a distance from the door and configured to record a movement of the door during an opening and/or a closing. The control unit is configured to (1) determine a position of a reference point of the door based on the recorded movement of the door, (2) determine a parameter of the movement of the door during the movement based on the determined position of the reference point, (3) determine a deviation of the parameter of the movement from a predetermined/allowed range of values of the parameter, and (4) determine an error in the operation of the door based on the determined deviation.

20 Claims, 5 Drawing Sheets

(51) Int. Cl.
  *E05F 15/40* (2015.01)
  *G06T 7/13* (2017.01)
  *G06K 9/52* (2006.01)
  *H04N 7/18* (2006.01)

(52) U.S. Cl.
  CPC ................. *G06K 9/52* (2013.01); *G06T 7/13* (2017.01); *H04N 7/183* (2013.01); *E05Y 2900/51* (2013.01); *E05Y 2900/531* (2013.01); *G06T 2207/30268* (2013.01)

(58) Field of Classification Search
  USPC .......... 382/276, 286–290, 312, 291; 105/240
  See application file for complete search history.

(56) References Cited

U.S. PATENT DOCUMENTS

| | | | |
|---|---|---|---|
| 2020/0024885 A1* | 1/2020 | Dreyer | E05F 15/40 |
| 2020/0031373 A1* | 1/2020 | Ohki | G08B 25/00 |
| 2020/0071133 A1* | 3/2020 | Kelly | G01V 8/10 |
| 2020/0284082 A1* | 9/2020 | Watanabe | B61L 27/0094 |
| 2021/0037215 A1* | 2/2021 | Hirai | H04N 7/181 |
| 2021/0124934 A1* | 4/2021 | Ohki | H04N 7/18 |

FOREIGN PATENT DOCUMENTS

| | | |
|---|---|---|
| JP | H0971240 | 3/1997 |
| WO | 2017215740 | 12/2017 |

OTHER PUBLICATIONS

Extended European Search report received in related European Application No. 20164550.4, dated Aug. 27, 2020.

\* cited by examiner

SYSTEMS AND METHODS FOR DOOR ERROR DETECTION

CROSS REFERENCE TO RELATED APPLICATIONS

This application claims priority to Swedish application number 1950417-4, filed on Apr. 4, 2019, the disclosure of which is incorporated by reference herein in its entirety.

FIELD OF THE DISCLOSURE

The disclosure relates generally to monitoring operations of doors of a vehicle. More specifically, the disclosure relates to systems and methods for monitoring operation of doors of a public transportation vehicle.

BACKGROUND

Vehicles for public transportation, such as trains, buses, trams, et cetera, rely on efficient and trouble-free operation of the vehicle doors. Door failures and mechanical problems with opening and closing are regarded as serious safety issues since they may lead to passenger injuries and potential deaths, especially when vehicle doors open prematurely or close too hard in an uncontrolled manner. Additionally, malfunctioning doors lead to delays, cancelations, customer dissatisfaction, and eventually loss of productivity and revenue. When a door error occurs, the vehicle often needs to be taken out of service immediately and taken into repair service.

Many mechanical errors can be automatically detected and identified before becoming serious via appropriate sensing and alarm systems. For example, it is known to monitor the current of an electrical motor operating the doors during the door movement when motor-driven door actuators are used. Deviation from norm values may by determined by the sensor detecting abnormally high or low mechanical resistance experienced by the motor. Such abnormal resistance may then be identified as an error and may be used to trigger an alarm signal. In another example of pneumatically controlled doors, it is known to use pressure sensors allowing similar analysis of the door operation. However, all the above techniques have the drawback of requiring installation of dedicated sensor hardware, signal processing, and data analysis units. Cost of installing such solutions may be very high, especially to retrofit configurations of existing vehicles.

Therefore, there is a need for improvements in this field, in particular, for a system that is reliable and yet cost-effective to produce, install, and operate. There is also a need for early detection of emerging errors, in order to detect errors before they become too serious, which enables repair of the doors at regular and planned servicing of the vehicle.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a system for monitoring an operation of a door of a public transportation vehicle. The system includes a video camera and a controller. The video camera is arranged at a distance from the door and is configured to record a movement of the door during opening and closing functions. The controller is arranged to receive video data from the video camera and to (1) determine a position of a reference point of the door in the video data, (2) determine a parameter of the movement of the door as a function over time during the opening or the closing from the video data as based on the position of the reference point, and (3) determine whether the movement of the door is normal or anomalous based on the parameter.

Optionally, the video camera is a surveillance camera connected to a surveillance system of the public transportation vehicle.

Optionally, the video camera is a closed-circuit television (CCTV) camera.

Optionally, the reference point of the door is selected from the group consisting of a mark and a recognizable geometrical feature.

Optionally, the reference point is determined by a Canny edge detection algorithm.

Optionally, determining whether the movement of the door is normal or anomalous includes a step of determining whether the parameter falls within or outside a predetermined allowed range of parameter values.

Optionally, the parameter is a position function of the reference point as a function over time.

Optionally, the parameter is a velocity function of the reference point as a function over time.

Optionally, the parameter is an acceleration function of the reference point as a function over time.

Optionally, determining whether the movement of the door is normal or anomalous includes a step of determining whether the parameter deviates from previously recorded and stored data of the same parameter and related to the same door.

Optionally, determining whether the movement of the door is normal or anomalous includes a step of determining whether the parameter as a function over time deviates from normal operations of similar doors based on an artificial intelligence algorithm with access to a database of recordings of the same parameter as a function over time for a plurality of previously recorded doors.

Optionally, the controller is configured to generate an alarm signal upon determining that the movement of the door is anomalous.

Optionally, the controller is partially or fully arranged in a control unit of the public transportation vehicle.

Optionally, the control unit is configured to determine a time window during which a door movement is expected. The control unit is further configured to determine that the movement of the door is anomalous if it is not initiated during the time window.

Optionally, the public transportation vehicle further includes a central control unit and a communication unit. The controller is partially or fully arranged in a central control unit. The central control unit is arranged externally from the public transportation vehicle. The communication unit is configured to wirelessly communicate with the central control unit.

In other embodiments, the disclosure provides a method for monitoring an operation of a door of a public transportation vehicle. The method includes the following steps: (1) recording video data of a movement of the door during an opening or a closing; (2) determining a position of a reference point of the door in the video data; (3) determining a parameter of the movement of the door as a function over time during the opening or the closing from the video data based on the position of the reference point; and (4) determining whether the movement of the door is normal or anomalous based on the parameter.

BRIEF DESCRIPTION OF THE DRAWINGS

Illustrative embodiments of the disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
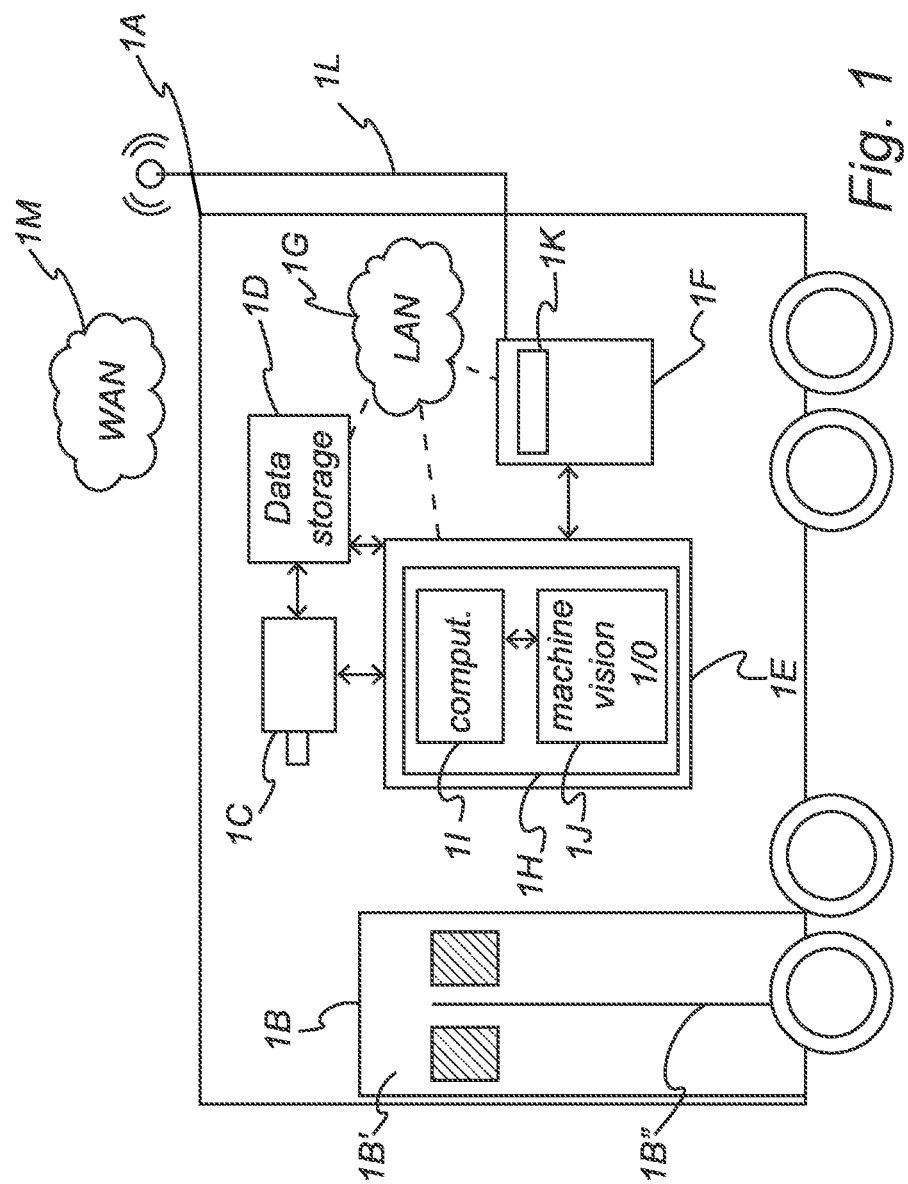
FIG. 1 is a schematic illustration of a side view of an interior of a vehicle cabin according to an embodiment of the disclosure.

FIG. 1 is a schematic illustration of a side view of an interior of a vehicle cabin according to an embodiment of the disclosure. Here, the vehicle cabin 1A may include at least one remotely controlled vehicle door 1B, which may be located in any appropriate part of the vehicle cabin 1A. For example, the door 1B may be in the front, in the rear, or in the middle of the vehicle. Optionally, the vehicle may include a plurality of remotely controlled doors 1B. For example, two, three, or more doors 1B. The doors 1B may be controlled remotely (e.g. by a driver) and may be moved pneumatically, hydraulically, mechanically, or electrically. The door(s) 1B may include a single door blade covering the entire door opening or two door blades. In the latter case, each door covers about a half of the door opening.

The vehicle cabin 1A may be a single cabin (or carriage) of a public transportation vehicle for transporting passengers/goods or a part of a plurality of cabins belonging to the same vehicle. The public transportation vehicle may be a vehicle suitable for transportation of passengers/goods such as a bus, a minibus, a tram, a train, a transportations van, et cetera.

The door 1B of the vehicle may be arranged with at least one door blade 1B'. The door blade 1B' may have freedom of movement in both horizontal and vertical directions. The door 1B may be arranged as a bi-folding door, which may enable the panels of the door to fold up against the vehicle sidewall. Alternatively, the door 1B may be arranged as a sliding door where door blades 1B' may be mounted or suspended from a track. The slide door 1B may open or close by sliding horizontally alongside or into the vehicle sidewall. The slide door 1B may further open or close by sliding vertically into the vehicle sidewall or the floor of the vehicle. According to an embodiment, the door 1B may have two door blades 1B' arranged to move in the opposite directions relative to each other when opening or closing. In such embodiment, edges of the door blades 1B' may be secured at a middle point 1B" in the completely closed condition of the door 1B. The door blades 1B' may be arranged to move away from each other during opening of the door 1B or move towards each other during closing of the door 1B.

At least one video camera 1C is arranged at a distance from the vehicle doors 1B, may be within the cabin 1A, and is directed so that it has a good line-of-sight towards the door 1B. The video camera 1C may be any camera intended for video recording, but a surveillance camera of the vehicle may be particularly desirable. Surveillance cameras are already provided on many public transportation vehicles, and the disclosed systems and methods of monitoring the doors may take advantage of the on-board surveillance system or CCTV cameras already installed inside the cabins and carriages of the vehicles. As a result, the cost efficiency of the door monitoring system may be significantly reduced since the disclosure may alleviate the requirement of installing separate door monitoring sensors. Further, the system may be installed at marginal costs and be easily adapted to the older models of transportation vehicles not equipped with surveillance cameras as a default system. Optionally, the video camera may be dedicated to the door monitoring when implemented as a stand-alone system.

The surveillance camera 1C installed in the cabin 1A of the vehicle may be arranged to record a video feed of the doors 1B of the vehicle during opening and/or closing. The surveillance camera unit 1C may connect to a data storage unit 1D.

The data storage unit 1D may be arranged to receive the video feed from the surveillance cameras 1C of the vehicle and store the video information for further processing in the system. The data storage unit 1D may connect to a control unit 1E of the system. In case multiple doors 1B are present, the video information may be stored with an identification tag for each door 1B. Further, the data may be stored in association with a time when the video data was recorded.

The control unit 1E may be arranged to retrieve the recorded data of the vehicle door operation (e.g. the recorded video feed) from the data storage unit 1D and to determine a normal or anomalous operation of the door 1B. The control unit 1E may include a computing system 1H and may coordinate the flow of data between the computing system 1H and other components. For example, the control unit 1E may assign an identification tag to a video feed associated with the vehicle door stored on the data storage unit 1D and send instructions to the computing system 1H to access the aforementioned video feed data for processing. The computing system 1H may further include an image processing and/or machine vision algorithm module 1I and a data analysis and computation module 1J. The video feed data may undergo an image processing step where the position of at least one reference point on the vehicle door 1B is identified by using a Canny edge detection algorithm or other feature-based tracking algorithms such as Harris or Shi-Tomasi corner detection or MIL tracker algorithm. The results of the machine vision processing then may be fed into the data analysis and computation module 1J. The module 1J may be arranged to compute a parameter of movement of the door 1B during the time period when the door 1B is opened and/or closed. This parameter may be a position, velocity, or acceleration function of the movement of the door 1B based on the known positions of the reference points of the door 1B during the time period for which the image analysis has been performed.

A person of ordinary skill in the art would understand that even though the control unit 1E, the computing system 1H, the computation module 1J, and the data storage 1D are illustrated herein as being arranged on-board the vehicle, all or part of these units/functions may be arranged at another location such as in a central controller or may be distributed among multiple locations. Further, these modules/systems/functions may be implemented in hardware (e.g. in dedicated units) or be arranged fully or partially in software. It is also possible to provide these modules/systems/functions as stand-alone units or integrated units connected with other data processing systems on-board the vehicle such as surveillance systems and/or communication systems.

The system may also include a communication unit 1F, or a communication system including such a communication unit. The communication unit 1F may include at least one router module 1K (or a mobile router) for data reception and transmission between an internal Local Area Network (LAN) 1G provided on-board the vehicle for connection to one or more client devices, and one or more Wide Area Networks (WANs) 1M. The communication unit 1F may also be arranged to communicate with various units inside the vehicle (for example, the data storage unit 1D, the control unit 1E, et cetera, via the LAN 1G). The LAN 1G may be a wireless network using one or several internal antennas to communicate with different units on-board. The LAN 1G may also be set up as a wired network. The communication unit may be arranged to use one or more antenna units 1L to communicate with external WANs 1M.

Figure 2A:
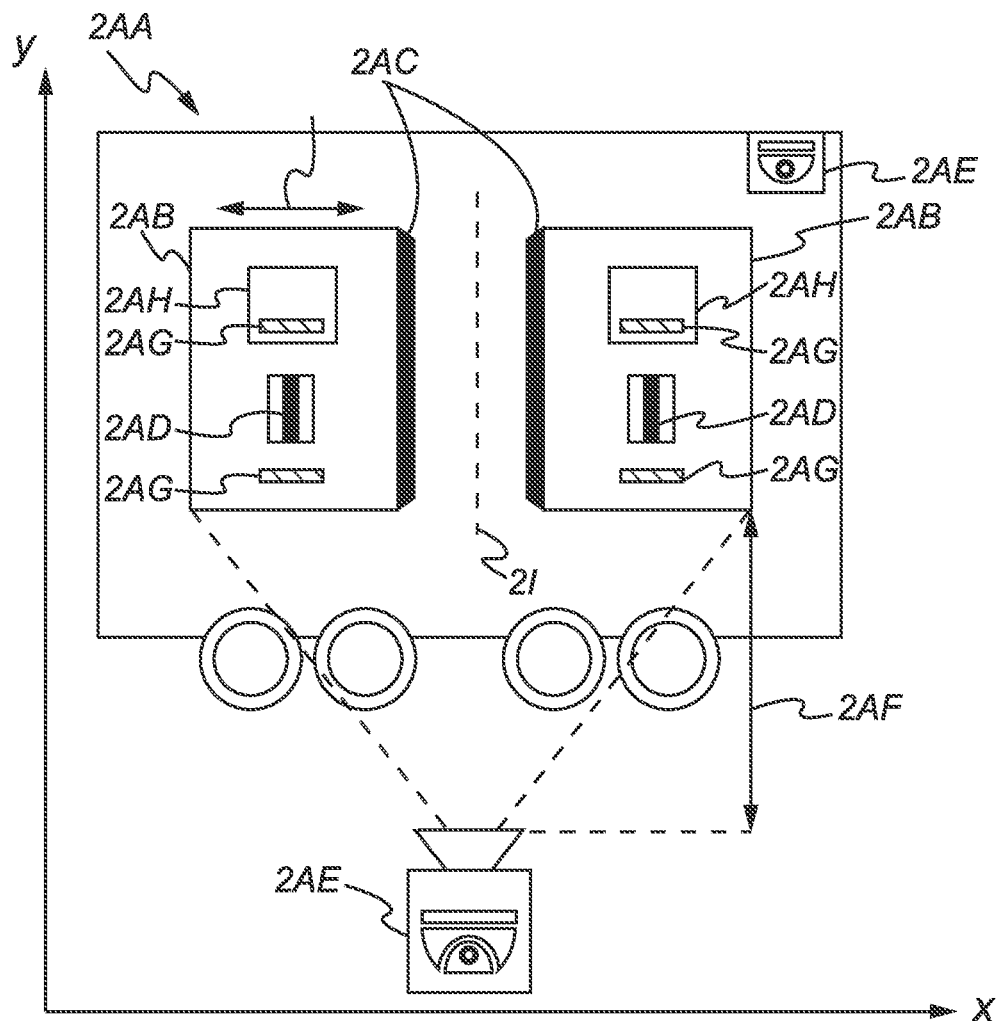
FIG. 2A is a schematic illustration of a side view of a door of a vehicle according to an embodiment of the disclosure.

FIGS. 2A and B disclose configurations of determining an error in the operation of the vehicle door according to some embodiments of the disclosure.

In FIG. 2A, a schematic illustration of a side view of a door of a vehicle in a vehicle cabin 2AA is provided. Door blades 2AB may be provided with predetermined artefacts or recognizable features 2AC and 2AD (for example, physical parts on the body of the door blades 2AB providing recognizable geometrical features, or markings or the like added to the door blades). The movement of the edges 2AC of door blades 2AB, a part of the door handle 2AD, or any other recognizable feature may serve as a reference point and may be tracked by at least one surveillance camera 2AE inside the vehicle cabin arranged at a known distance 2AF from the door blades 2AB. In one embodiment, the door blades 2AB may be provided with external markings 2AG on at least one part of the surface of the door blades 2AB or on the surface of vehicle windows 2AH. The camera 2AE may be arranged to record the movement of the door edges 2AC (or other recognizable features) during the opening and/or closing of the door blades 2AB. Here, the control unit 1E may determine, initiate, or control the camera 2AE to start recording the movement of the door when the door blades 2AB start to move away from each other when the doors are opened, and to continue the recording for the full duration of opening and closing of the doors. Recording may also be initiated by a trigger such as a signal for opening the doors. Also, the recording may be continuous or discontinuous.

Figure 2B:
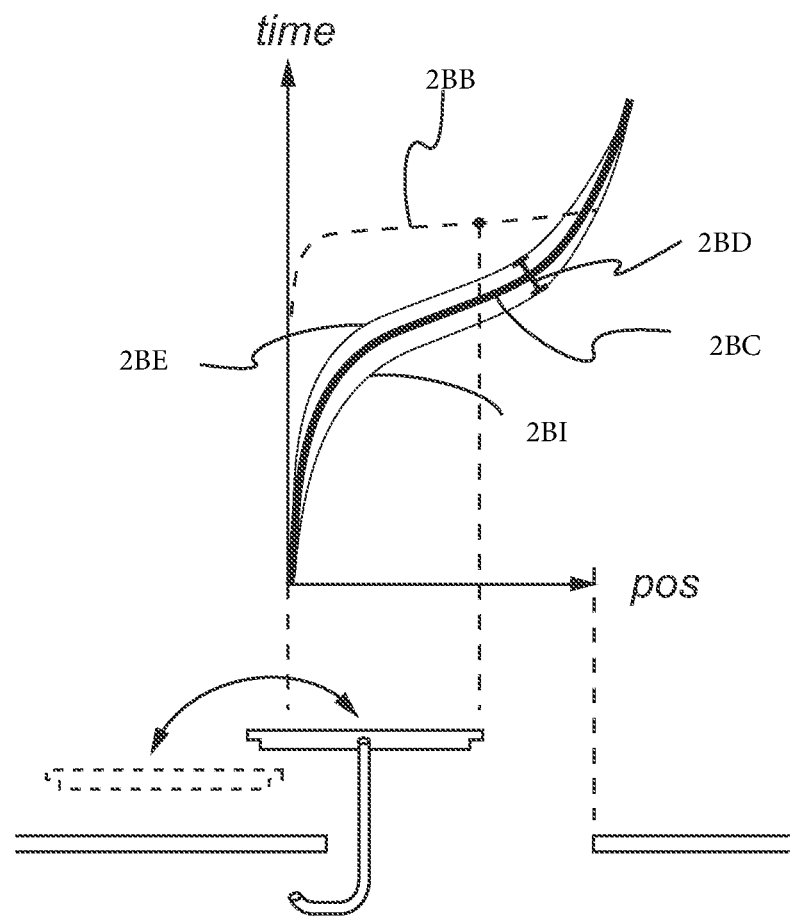
FIG. 2B is a schematic illustration of a position curve of a door of a vehicle according to an embodiment of the disclosure.

As shown in FIG. 2B, after the image processing module 1I has identified the positions of the features 2AC, 2AD, 2AG in the recorded video, a one-dimensional or two-dimensional position function may be created by the control unit 1E for each feature. The recorded result of tracking (e.g. an exemplary feature 2BA of the door blade) may be inserted into a curve-fitting algorithm by the data analysis module 1J of the control unit 1E. The identified curve 2BB may then be compared with an averaged curve 2BC associated with non-anomalous movement of the door, including a margin for variances. In an embodiment, if the curve 2BB is determined to fall outside an allowed window of variance 2BD with the upper 2BE and lower 2BF boundaries around the averaged curve of allowed values 2BC, an error in the operation of the doors may be determined by the system.

Figure 3:
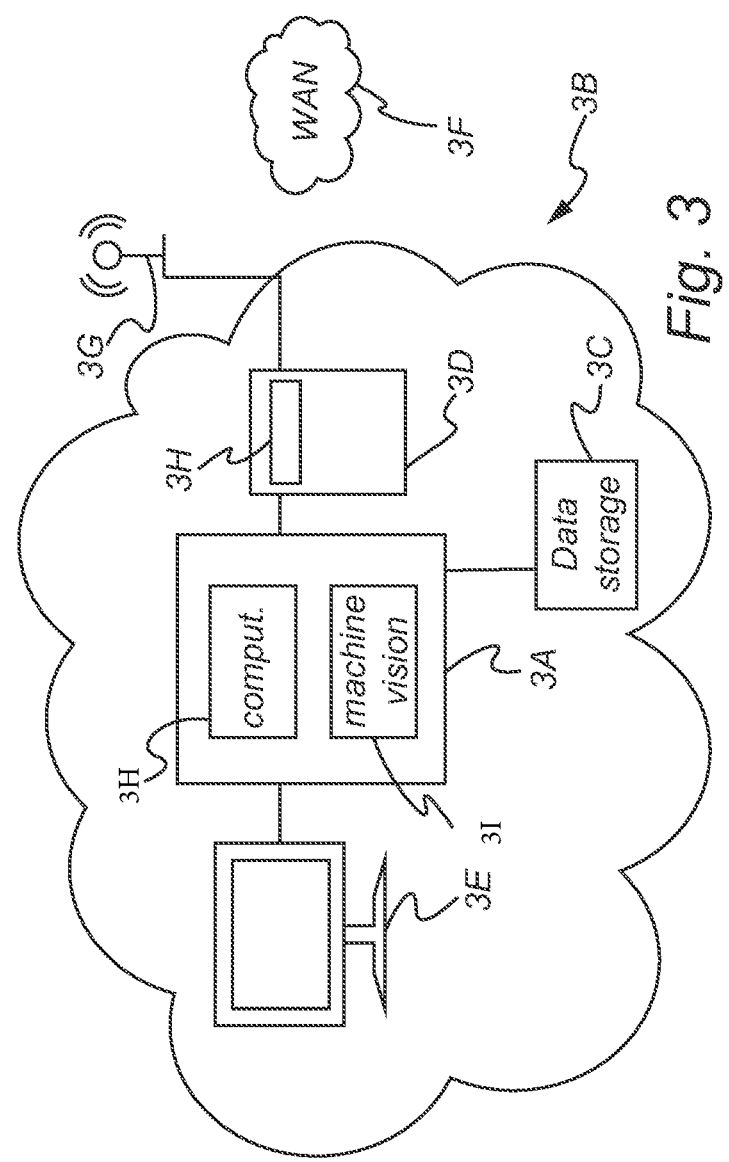
FIG. 3 is a schematic illustration of an external data center and a remote central controller according to an embodiment of the disclosure.

FIG. 3 is a schematic illustration of an external data center and a remote central controller according to an embodiment of the disclosure. Here, an external data center may serve as a remote control unit. The control unit 3A may be arranged at the remote data center 3B. However, the remote control unit may also serve other purposes such as receiving data from the controller of the vehicle, determining present status of the door operation within the vehicle, determining appropriate time of servicing, et cetera. According to an embodiment, the control unit 3A may be connected to a data storage unit 3C arranged to store the video feeds received form the vehicle. The control unit may include a computing system 3H, an image processing and/or machine vision algorithm module 3I, a data analysis and computation module, et cetera, similar to configuration in FIG. 1. The control unit 3A may be further connected to the communication unit 3D and to the central vehicle management system 3E. The communication unit 3D may be arranged to send/receive data to/from the vehicle and may be connected to at least one WAN 3F. The remote data center may be further provided with at least one antenna unit 3G for wireless communication. The communication unit may further include a mobile router 3H for long range wireless communication with the vehicles.

Figure 4:
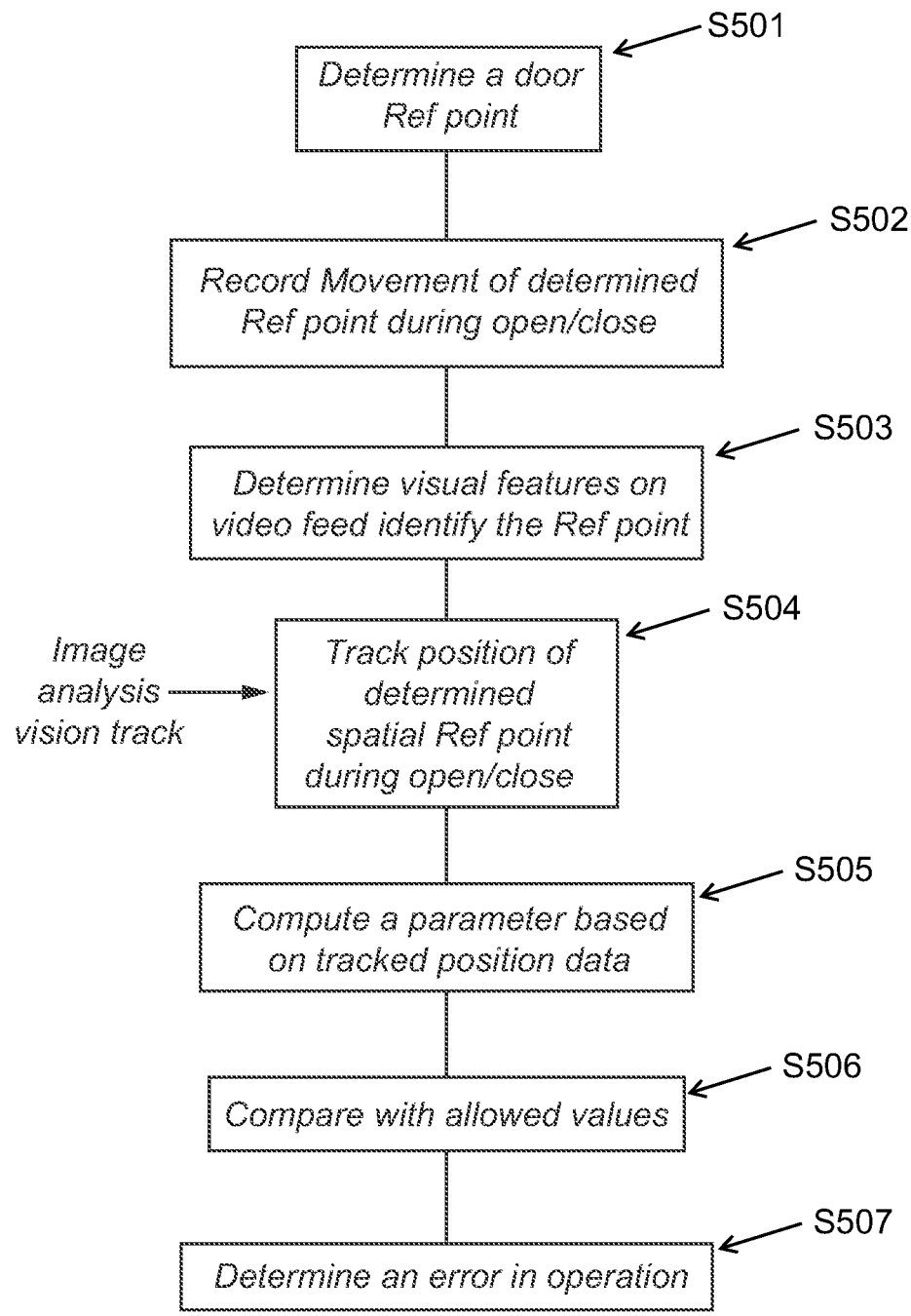
FIG. 4 is a flowchart illustrating an error determination process according to an embodiment of the disclosure.

FIG. 4 is a flowchart illustrating an error determination process according to an embodiment of the disclosure. As shown in FIG. 4, the process may include steps S501-S507. In step S501, a door reference point may be determined. In step S502, a movement of the door (or the reference point) may be recorded during an opening or a closing. In step S503, the video may be analyzed to identify the reference point. In step S504, the position of the determined reference point during the movement may be tracked and analyzed. In step S505, a parameter over time may be determined based on the analysis. In step S506, the parameter then may be compared with allowable values (or a range of allowable values). In step S507 the process may determine whether the door operates erroneously or not based on the comparison in step S506.

The invention has now been described with reference to specific embodiments. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "including" does not exclude the presence of other elements or steps than those listed in the claim. The word "a" or "an" preceding an element does not exclude the presence of a plurality of such elements.

Various embodiments of the disclosure may have one or more of the following effects.

In some embodiments, the disclosure may provide systems and methods for monitoring the operation of a door of a public transportation vehicle. The disclosed methods and systems may alleviate all or at least some of the drawbacks of presently known systems.

In other embodiments, the disclosure may provide a system for monitoring an operation of a door of a public transportation vehicle. The system may include at least one video camera arranged at a distance from the door and a controller arranged to receive video data from the video camera. The at least one video camera may be configured to record a movement of the door during opening and/or closing of the door. The controller may be configured to determine a position of at least one reference point of the door in the video data; determine a parameter, as a function over time, of the movement of the door during opening and/or closing from the video data, and based on the determined position of the at least one reference point; and determine from the determined parameter whether the movement of the door is normal or anomalous.

A public transportation vehicle is a vehicle which may be included in a fleet of vehicles and used for public transportation. The public transportation vehicle may be a vehicle to carry passengers and/or cargo such a bus, a mini-bus, a transportation van, a train of a railway system, a train of a subway system, a tram, a rapid transit train, an autonomous or semi-autonomous vehicle, et cetera.

A parameter of movement of the door means a characteristic by which any mechanical movement of the door of a vehicle may be identified. Such characteristic may be a real time position of the door as a function over time. For example, a series of data of the positions at different time positions during a continuous movement of the door. However, the parameter may additionally or alternatively be a velocity of the movement of the door as a function over time, the acceleration with which the door moves during opening and closing as a function over time, et cetera.

With the disclosed systems and methods, monitoring of the operation of the doors in a public transportation vehicle may be implemented in a very reliable way. The disclosure may be based on the notion that by studying the position of a door movement over time, it is possible to identify emerging errors at a very early stage. Further, the monitoring may be implemented in an automated way, and may be implemented continuously, discontinuously, or periodically every time the door is moved.

Here, the status of the operation of vehicle doors may be monitored so that anomalies may be detected before the errors become too serious. One advantage of such continuous monitoring may be that by timely identifying any malfunctioning in the system of operation of the doors, the maintenance and repair procedure may be accordingly planned. For example, this may allow door errors to be repaired during regular servicing of the vehicle. This in turn may enable the public transport system to significantly reduce unwanted delays due to faulty doors, increase passenger satisfaction, reduce maintenance costs, and contribute to increasing productivity.

Further, the system may be very cost-efficient. Video cameras are nowadays relatively low in cost; and as a result, providing dedicated video cameras to monitor each door does not require any great investment. In fact, since video cameras are already present on most public transportation vehicles, and in many cases already positioned in a way that allows the doors to the monitored as disclosed herein, an even more cost-effective solution is to use such surveillance cameras also for monitoring the operation of the doors.

Thus, according to an embodiment, the video camera may be a surveillance camera connected to a surveillance system of the public transportation vehicle. In particular, the video camera may be a closed-circuit television, CCTV, camera that is part of a surveillance camera system of the public transportation vehicle. The surveillance camera system may be installed in multiple locations of a cabin or carriage of the public transportation vehicle, and the surveillance camera system may be installed inside or outside the cabin or carriage of the vehicle.

The cameras may be distributed in the inner space of the vehicle such that they may have the same or different distances and the same or different viewing angles toward the doors. The cameras may view the inner frame of the door, a space between the door and the body of the vehicle, as well as full horizontal and vertical front view of the door blades. The system may include a plurality of cameras aligned to cover at least one door blade. Such a multitude of cameras may make it easier to exactly determine the three-dimensional movement of the door.

The video feed of each door or each door blade, both from the inside and the outside, may be assigned a unique identification tag in the form of a digital identification file ID. The file may be a session file including the recorded video feed and operation information of the vehicle door including date, time, location of the door, et cetera. As it should be appreciated, each door may be arranged to be uniquely identified in the monitoring system with the information package associated with the door stored in a session file with the identification tag of the door. The session file of each identified door may keep its original ID during all steps of monitoring process or may be assigned an updated ID after each step. In all cases the operation data may be uniquely associated with the same door. The session files of the doors may be stored in a local or remote database or a local or remote data storage unit and easily retrieved upon request.

The sensitivity and resolution of the cameras may be selected such that the recorded video is suitable for further data processing such as image processing or to be used as an input for machine vision algorithms.

According to an embodiment, one or more surveillance cameras may be installed outside the public transportation vehicle. The cameras may be pointed at the same or different angles of the outer parts of the vehicle doors. The cameras may have the same or different distances from the doors. The video feed from the outside cameras may be used for monitoring the operation of the vehicle door on its own or may be used in combination with the video feed from the surveillance cameras inside the vehicle and monitoring the inner parts of the same door.

Optionally, in addition to the vehicle surveillance system, other tracking sensor equipment may also be installed on board of the vehicle. For example, additional optical sensors such as infrared tracking sensors may be used. The infrared tracking sensors may be configured to track the movement of the vehicle doors using the infra-red wavelengths. The vehicle surveillance system may further be equipped with laser distance sensors and range finder systems based on the requirements of the monitoring system.

The vehicle doors may be operated in various fashions as known in the art. For example, the doors may be operated pneumatically, electrically, hydraulically, mechanically, et cetera.

In some embodiments, the movement of the doors may be monitored based on the movement of at least one reference point on or at the doors. The movement of the reference points may be used as a proxy for movement of the doors. The optical sensors may track the movement of the door during opening and/or closing and record the position of the reference point on the door. The reference point of the door may be at least one of a mark and a recognizable geometrical feature. The reference point may be determined with a Canny edge detection algorithm. The recognizable geometrical feature may be a specific edge, corner, or the like located on the door blade, a window, or other discernible part of the door. In case a specific mark is used, the mark may be painted or adhered to the door at a desired position. The marking(s) may be reflective stickers, colored markings, industrial marking tapes, et cetera, which may be easily identified and tracked by the surveillance camera system of the vehicle. It is also feasible to use a door handle of the door or any other physical part of the door suitable for being optically identified and tracked.

The step of determining whether the movement is normal or anomalous may include a step of determining whether the determined parameters fall within a predetermined allowed range of values for the parameters. "Falling within a predetermined/allowed range of values" means that a parameter for a door, when the door is operated in normal and fully functional state, has a range of values which represent a correct operation of the door in that movement. Such normal values, and some additional range around these values, due to variance, et cetera, may be considered to be the predetermined/allowed range. When a measurement of that parameter during movement of the door returns a value falling outside the allowed range of values associated with correct operation of the door, a difference or deviation from normal state occurs. By determining such deviation through comparison of measured and predefined nominal/allowed values, an error in the movement of the door may be determined. As a result, a continuous monitoring of the door operation during opening and/or closing may be achieved and the efficiency of error identification at early stages may be significantly improved. Further, such configuration may allow minor deviations falling outside the predetermined/allowed range to be detected as minor errors, whereas greater deviations may be determined to be more serious errors. Further, the determination may also include comparing the deviations with previously recorded data for the same door to see whether there is a trend towards greater deviations or not. If so, this may be used to predict when the error will develop into a serious matter.

The parameter may be a position function of the reference point as a function over time. Thus, the parameter defines the movement of the reference point along a determined path. Optionally, the parameter may be a velocity of the reference point as a function over time, or an acceleration of the reference point as a function over time.

The determination of whether the movement is normal or anomalous may include determining whether the determined parameter deviates from previously recorded and/or stored data for the same parameter and related to the same door.

The determination of whether the movement is normal or anomalous may optionally include determining whether the parameter, as a function over time, deviates from normal operation of such doors, based on artificial intelligence with access to a database of recordings of the same parameter, as a function over time, for a plurality of previously recorded doors. To this end, the artificial intelligence may have access to a plethora of recorded door movements, both working normally and working with an anomaly. Based on this data, the artificial intelligence may be trained to discern anomalies in a fresh recording of a door movement.

The controller may be at least partially arranged in a control unit on-board the public transportation vehicle. However, the controller may also be at least partially arranged in a central control unit which may be arranged externally from the public transportation vehicle. The vehicle may further include a communication unit configured to wirelessly communicate with the central control unit. The controller may also be a distributed controller arranged in parts at different locations, such as partially in the vehicle and partially in the central control unit.

In case an on-board control unit is used, the system may make use of already available on-board computing capacity of the public transportation vehicle, such as a communication router, a surveillance controller, et cetera. The advantage of using the existing computer systems which have access to the camera feed may be lowering the installation costs significantly. However, the system may also be implemented as a stand-alone system for existing or older models of the vehicle not having the surveillance camera system and/or the communication system by default.

The control unit may include a computing system having an image processing module and a data analysis module. The computing system may be arranged to run image processing and machine vision algorithms. The computer vision system may be configured to process and synthesize data and information from the video camera to detect, identify, track, and analyze the position of the reference points of the vehicle doors. Further, the computer vision system may predict the presence, location, classification, and/or trajectories of the reference points, objects, and features in the environment inside or outside the vehicle. The computing system of the control unit may preferably compute the translational motion of the doors of the vehicle based on the tracking data of the reference points on the vehicle doors generated from machine vision algorithms in one, two, or three dimensions. The control unit may be arranged to assign a unique identification tag to each recorded video feed and door operation information stored in the data storage unit. The control unit may further be configured to store the data in a data storage unit, associated with suitable ID tags, to allow use of the data for trend analyses.

In some embodiments, the control unit may be arranged to use a plurality of data points associated with the position of one or more reference points on the vehicle door to arrive at a parameter of the door movement. Such parameter may be a real-time position function of the reference point, a position function of a plurality of recorded position data of the at least one reference point, a velocity function of a single or plurality of recorded position data of the at least one reference point, or an acceleration function of a single or plurality of the recorded position data of the at least one reference point.

The control unit may be configured to determine a time window during which a door movement is expected. This may be used to trigger recording of video data during this window. It may also be used to determine that the movement of the door is anomalous if the door movement is not initiated during this time window. As a result, if the processing of the position of any individual door blade does not recognize a normal movement within this time window, a signal may be generated by the control unit and an alarm may be triggered.

It is also possible to assign different time windows for different functions. For example, a first time window for determining that the door movement was not initiated in due time, and a second time window, optionally longer than the first one, during which recording of video data should be made.

Accordingly, the control unit may be configured to determine the parameter of the movement of the door over a predetermined time period.

The predetermined time period (or time window) may be activated when a door opening signal from a door control system of the public transportation vehicle is detected by the control unit. Thus, the synchronization trigger may be taken from the electrical signal within the vehicle's door control circuitry which commands the opening of doors, and may then also be supplied to the processing units of the inventive system. The time window may begin at the instance of the door opening signal and extend for at least the time duration of a non-anomalous door movement (optionally for a longer time) to enable recording of door movements which are slower than normal, due to an anomaly.

The predetermined time period, or time window, may also be activated when a luminescence signal from one or more illuminators of the door of the public transportation vehicle is detected by the video camera or by an additional optical sensor. In such embodiment, advantage may be taken from the fact that lights are often present near the doors and lit as the doors are about to open. Such lights may be colored warning or attention signal lights or lights for illumination of the area around the doors. In this embodiment, additional processing of the video feed related to the door may be performed and the luminance of such lights may be determined. When the lights turn on, a synchronization trigger may be generated to start the time window. The time window may be closed after either a fixed amount of time or after the lights are detected to have been turned off.

The predetermined time period may also be set by an operator at any fixed value based on the requirements of the system. For example, the predetermined time period may be arranged to be equal to a time period of opening and/or closing of a fully functional door of the public transportation vehicle. The predetermined time period may be arranged to be equal to an actual duration of opening and/or closing the door under evaluation. The data acquisition by the video camera may have any repetition intervals set in the monitoring system. The repetition interval may be every event of opening and/or closing the doors, once every hour, once per day, et cetera. However, the video data may also be recorded continuously, discontinuously, or periodically. And the video data may be continuously, discontinuously, or periodically analyzed to detect any occurrence of a door movement.

Any parameters of the movement of the doors of the public transportation vehicle (e.g. the position function, the velocity function, the acceleration function, et cetera) may be arranged to be recorded and computed over this predetermined time window or any other time period required to implement different designs of the door monitoring system. For instance, the predetermined time period may be a fraction of the time needed for the full opening and/or closing of the fully functional door, or it may be exceeding this time, such as double, triple, or the like of the time for opening and/or closing of the door under evaluation or the fully operative door.

The controller may be configured to generate an alarm signal upon determination that the movement of the door is anomalous. The generated alarm signal may be a sound signal, an optical signal (e.g., flashing danger lights), an alert notification in the vehicle operation display (e.g. a pop-up alert), or an instance recorded in a log data of the vehicle. The alarm signal may also be a message sent to a predetermined recipient. The alarm signal may be registered in a vehicle diagnostics log data and be used at the time of maintenance service of the vehicle. The alarm signal may also be communicated to the driver of the public transportation vehicle to take proper measures to ensure the integrity of door functionality or take actions to halt the operation of the vehicle in case the faulty door imposes any hurdles for further operation of the vehicle. The alarm signal may also be communicated to the passengers on board to keep a safe distance from the faulty door or as a signal to prepare the passengers to evacuate the vehicle.

The controller may further be arranged to determine the severity of the door movement anomaly based on how much the determined parameter deviates from a normal state, and issue different alarm signals to different recipients based on the severity.

The alarm signal may also be sent directly to a remote data center or a central vehicle management system which may in turn take actions by taking the vehicle out of its routine operation schedule or activating a repair protocol for the faulty door or the like.

In other embodiments, the disclosed system may include a communication unit or a communication system having such a communication unit. The communication unit may be a mobile router and may be configured to wirelessly communicate with the remote data center.

The communication unit may connect to a Wide Area Network (WAN) in accordance with Wireless Local Area Network (WLAN) standards (e.g. IEEE 802.11 standards), Local Area Network (LAN), dedicated short range communication (DSRC) channels, or any other short or long-haul communication network for receiving and transmitting information. The communication unit may be configured to be a part of the control unit or a stand-alone unit connected to the control unit. The communication unit may be arranged for receiving and transmitting information on board of the vehicle or to one or more remote data centers or the central vehicle management system. Further, the communication unit may be arranged to communicate via any telecommunication technology, such as via 3G, 4G, 5G, et cetera.

The control unit may be arranged on board of the public transportation vehicle, arranged at the remote data center, or distributed among these units. The control unit may be integrated within the communication unit or any available on-board computer network to connect to the video cameras (e.g. surveillance cameras), the data storage unit, et cetera.

The remote data center may be a part of the central vehicle management system. The remote data center may be arranged to have wireless communication functions and necessary equipment such as antenna structures, routers, mobile sender/receiver equipment, et cetera. The remote data center may use WLAN standards or cellular data communication network to communicate with public transportation vehicles via establishing data links. The public transportation vehicle may also be equipped with wireless communication equipment such as antenna structures and routers to establish communication data links with the remote data center and remote control unit.

In an embodiment, the control unit may be configured to generate a diagnostic data report of the movement of the door of the public transportation vehicle based on the determined parameter of the movement of the door. The diagnostic data report may be stored in the local data storage unit or sent to the remote data center and stored in a remote data storage unit.

In another embodiment, the control unit may be configured to generate a request-to-service signal based on the diagnostic data report of the movement of the door of the vehicle. Based on the level of seriousness and urgency of the determined error in the operation of the door, the control unit may arrange a request to schedule a repair service for the faulty door. The service may be scheduled as a supplementary maintenance service or simply may be added to the regular service scheme of the vehicle.

In a further embodiment, the computing system may include a Canny edge detector. The information obtained by the Canny edge detector from the video feed of the cameras may be used as input to a Hough transform with the output of the Hough transform. The information may include angles within a small range around the possible angles of the vertical edges of the door blades as perceived by the video cameras throughout the range of movement of the door. The Hough transform may identify straight edge features parallel to the edge of the door blade in the video stream and localize them within the video frame.

In an embodiment, a feature-based tracking algorithm such as Harris or Shi-Tomasi corner detection or the multiple instance learning (MIL) tracker algorithm may be used to track visual features on the door blades as proxies for the movement of the door.

In another embodiment, one-dimensional position or two-dimensional positions of tracked visual features on the doors may be presented as a function over time to a curve-fitting algorithm. The result of the algorithm may be compared with a nominal door movement curve. If the fitted curve matches the nominal curve within an allowed window of variance, a non-anomalous door movement event may be recorded.

In a further embodiment, the one-dimensional, two-dimensional, or three-dimensional positions of tracked visual features may be presented as a function over time to an artificial neural network trained on a set of non-anomalous door movements. If the network recognizes the function shape, a non-anomalous door movement event may be recorded.

In some embodiments, the disclosure provides a method for monitoring an operation of a door of a public transportation vehicle. The method may include the following steps: recording video data of a movement of the door during opening and/or closing of the door; determining a position of at least one reference point of the door in the video data; determining a parameter, as a function over time, of the movement of the door during opening and/or closing from the video data, and based on the determined position of the at least one reference point; determining from the determined parameter whether the movement of the door is normal or anomalous.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A system for monitoring an operation of a door of a public transportation vehicle, comprising:
a video camera arranged at a distance from the door, the video camera being configured to record a movement of the door during at least one variation selected from the group consisting of opening and closing; and
a controller arranged to receive video data from the video camera, the controller being configured to:
determine a position of a reference point of the door in the video data;
determine a parameter of the movement of the door as a function over time from the video data based on the position of the reference point; and
determine whether the movement of the door is normal or anomalous based on the parameter;
wherein:
the reference point is determined by a Canny edge detection algorithm;
the parameter is an acceleration function of the reference point as a function over time; and
determining whether the movement of the door is normal or anomalous comprises
a step of determining whether the parameter as a function over time deviates from normal operations of similar doors based on an artificial intelligence algorithm with access to a database of recordings of the same parameter as a function over time for a plurality of previously recorded doors.

2. The system of claim 1, wherein the video camera is a surveillance camera connected to a surveillance system of the public transportation vehicle.

3. The system of claim 1, wherein the video camera is a closed-circuit television (CCTV) camera.

4. The system of claim 1, wherein the reference point of the door is selected from the group consisting of a mark and a recognizable geometrical feature.

5. The system of claim 1, wherein determining whether the movement of the door is normal or anomalous comprises a step of determining whether the parameter falls within a predetermined allowed range of parameter values.

6. The system of claim 1, wherein determining whether the movement of the door is normal or anomalous comprises a step of determining whether the parameter deviates from previously recorded and stored data of the same parameter and related to the same door.

7. The system of claim 1, wherein the controller is configured to generate an alarm signal upon determining that the movement of the door is anomalous.

8. The system claim 1, wherein the controller is partially or fully arranged in a control unit of the public transportation vehicle.

9. The system of claim 8, wherein:
the control unit is configured to determine a time window during which a door movement is expected; and
the control unit is further configured to determine that the movement of the door is anomalous if it is not initiated during the time window.

10. The system of claim 1, wherein:
the public transportation vehicle further comprises a central control unit and a communication unit;
the controller is partially or fully arranged in the central control unit;
the central control unit is arranged externally from the public transportation vehicle; and
the communication unit is configured to wirelessly communicate with the central control unit.

11. A method for monitoring an operation of a door of a public transportation vehicle, comprising the steps of:
recording, via a video camera, video data of a movement of the door during at least one variation selected from the group consisting of opening and closing;
determining a position of a reference point of the door in the video data;
determining a parameter of the movement of the door as a function over time during the movement from the video data based on the position of the reference point; and determining whether the movement of the door is normal or anomalous based on the parameter;

wherein:

the reference point is determined by a Canny edge detection algorithm;

the parameter is an acceleration function of the reference point as a function over time; and determining whether the movement of the door is normal or anomalous comprises a step of determining whether the parameter as a function over time deviates from normal operations of similar doors based on an artificial intelligence algorithm with access to a database of recordings of the same parameter as a function over time for a plurality of previously recorded doors.

12. The method of claim 11, wherein the video camera is a surveillance camera connected to a surveillance system of the public transportation vehicle.

13. The method of claim 11, wherein the video camera is a closed-circuit television (CCTV) camera.

14. The method of claim 11, wherein the reference point of the door is selected from the group consisting of a mark and a recognizable geometrical feature.

15. The method of claim 11, wherein the controller is configured to generate an alarm signal upon determining that the movement of the door is anomalous.

16. The method of claim 15, wherein the controller is partially or fully arranged in a control unit of the public transportation vehicle.

17. The method of claim 16, wherein:

the control unit is configured to determine a time window during which a door movement is expected; and the control unit is further configured to determine that the movement of the door is anomalous if it is not initiated during the time window.

18. The method of claim 11, wherein the controller is partially or fully arranged in a control unit of the public transportation vehicle.

19. The method of claim 18, wherein:

the control unit is configured to determine a time window during which a door movement is expected; and the control unit is further configured to determine that the movement of the door is anomalous if it is not initiated during the time window.

20. The method of claim 11, wherein:

the public transportation vehicle further comprises a central control unit and a communication unit;

the controller is partially or fully arranged in the central control unit;

the central control unit is arranged externally from the public transportation vehicle; and the communication unit is configured to wirelessly communicate with the central control unit.

* * * * *